(12) United States Patent
Kim et al.

(10) Patent No.: US 10,015,850 B2
(45) Date of Patent: Jul. 3, 2018

(54) LIGHTING APPARATUS

(71) Applicant: LUMENS CO., LTD., Yongin-si, Gyeonggi-do (KR)

(72) Inventors: Tai-Hyun Kim, Yongin-si (KR); Jong-il Kim, Yongin-si (KR); Hyun-Pyo Hong, Yongin-si (KR); Jun-Hyung Lim, Yongin-si (KR); Tae-Kwan Lee, Yongin-si (KR); Young-Jun Lee, Yongin-si (KR)

(73) Assignee: LUMENS CO., LTD., Yongin-si (KR)

( * ) Notice: Subject to any disclaimer, the term of this patent is extended or adjusted under 35 U.S.C. 154(b) by 0 days.

(21) Appl. No.: 15/409,730

(22) Filed: Jan. 19, 2017

(65) Prior Publication Data

US 2017/0245333 A1  Aug. 24, 2017

(30) Foreign Application Priority Data

Feb. 22, 2016 (KR) .......................... 10-2016-0020469

(51) Int. Cl.
*H05B 37/00* (2006.01)
*H05B 39/00* (2006.01)
*H05B 41/00* (2006.01)
*H05B 33/08* (2006.01)

(52) U.S. Cl.
CPC ....... *H05B 33/0815* (2013.01); *H05B 33/083* (2013.01); *H05B 33/089* (2013.01); *H05B 33/0842* (2013.01); *H05B 33/0809* (2013.01); *H05B 33/0824* (2013.01); *H05B 33/0827* (2013.01); *Y02B 20/346* (2013.01); *Y02B 20/347* (2013.01)

(58) Field of Classification Search
CPC .............. H05B 33/083; H05B 33/0815; H05B 33/0827; H05B 33/0824; H05B 33/0809; H05B 33/0845; Y02B 20/347; Y02B 20/346
USPC ..... 315/193, 185 R, 192, 91, 307, 186, 297, 315/122; 362/231, 227
See application file for complete search history.

(56) References Cited

U.S. PATENT DOCUMENTS

| | | | |
|---|---|---|---|
| 2011/0084619 A1* | 4/2011 | Gray | H05B 33/0824 315/185 R |
| 2016/0007420 A1* | 1/2016 | Gong | H05B 33/0815 315/187 |

FOREIGN PATENT DOCUMENTS

| | | |
|---|---|---|
| JP | 2010-526696 A | 8/2010 |
| JP | 2011-87298 A | 4/2011 |
| JP | 2013-545238 A | 8/2013 |

(Continued)

OTHER PUBLICATIONS

First Office Action dated Jun. 14, 2016, in Japanese Patent Application No. 2016-077366 and English translation thereof, 15 pgs.

(Continued)

*Primary Examiner* — Alexander H Taningco
*Assistant Examiner* — Christian L Garcia
(74) *Attorney, Agent, or Firm* — Mei & Mark LLP

(57) ABSTRACT

Disclosed herein is a lighting apparatus capable of uniformly maintaining power consumed by light emitting units even in the case in which various voltages are applied, and increasing power efficiency while minimizing a heating problem by adjusting a reference voltage applied to a connection structure of the light emitting units and a distribution switch according to magnitude of the applied voltage.

9 Claims, 15 Drawing Sheets

(56) References Cited

FOREIGN PATENT DOCUMENTS

JP    2014-505328 A    2/2014

OTHER PUBLICATIONS

Applicant argument dated Aug. 19, 2016 in response to First Office Action in Japanese Application No. 2016-077366 (English translation), 27 pgs.
Second Office Action and Notice of Allowance dated Nov. 8, 2016, in Japanese Patent Application No. 2016-077366 and English translation thereof, 6 pgs.

* cited by examiner

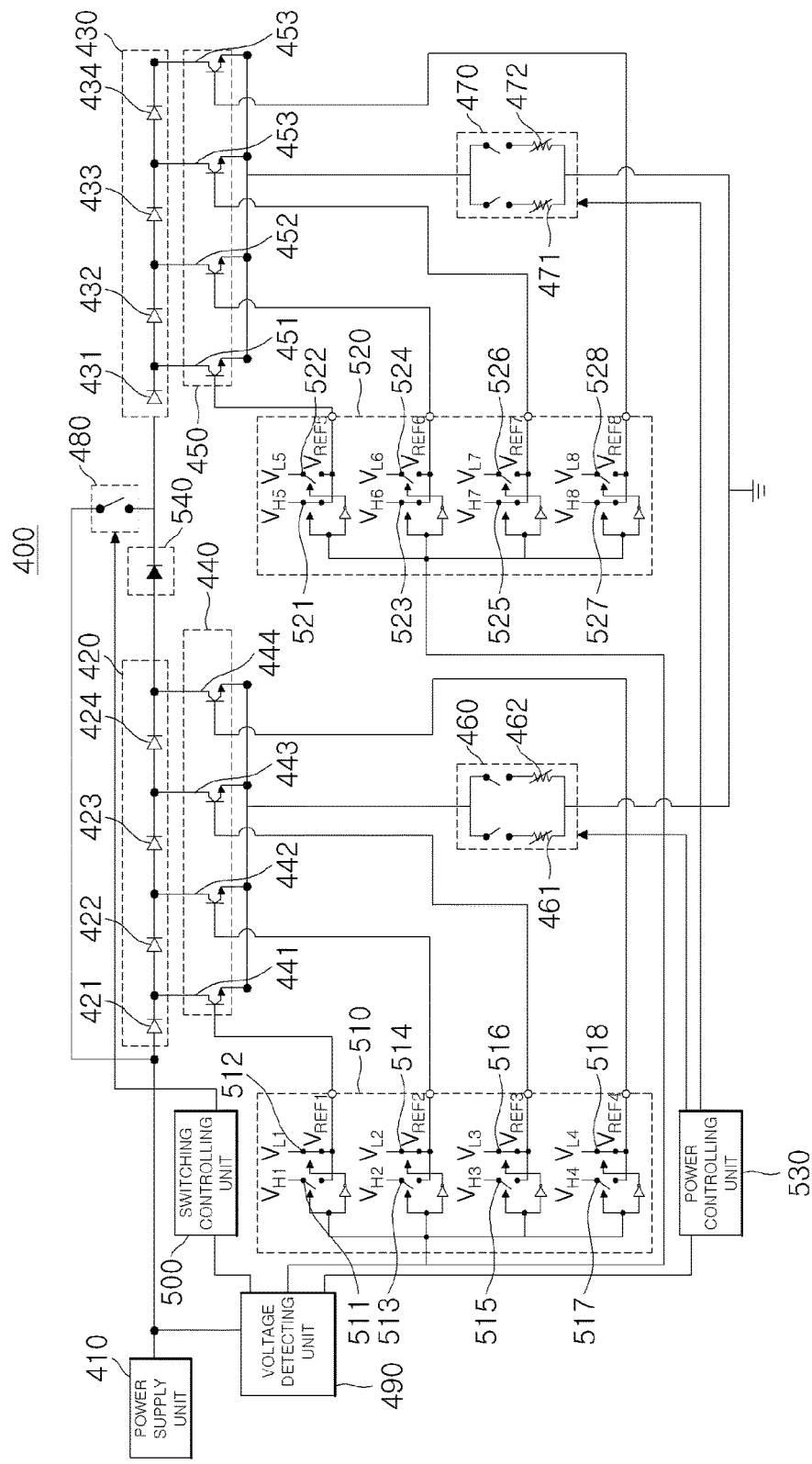

LIGHTING APPARATUS

RELATED APPLICATIONS

This application claims priority to Korean Patent Application No. 10-2015-0020469, filed on Feb. 22, 2016, which is herein incorporated by reference in its entirety.

BACKGROUND

Field

The present invention relates to a lighting apparatus that may be used even at various voltages.

Description of the Related Art

A light emitting diode (LED) refers to a kind of semiconductor element capable of implementing light having various colors by configuring a light emitting source by forming a PN diode of a compound semiconductor. Such light emitting element has advantages that it has a long lifespan, it may be miniaturized and lightened, and it may be driven at a low voltage. In addition, since the above-mentioned LED may have impact resistance and vibration resistance, may not need a preheating time and complex driving, and may be packaged after being mounted on a substrate or a lead frame in various forms, it may be modularized in various applications to be applied to a backlight unit, a variety of lighting apparatuses, or the like.

A voltage value of commercial alternating current (AC) power used for the lighting apparatus varies depending on a region in which the lighting apparatus is used. Accordingly, as different AC power sources are applied to the lighting apparatus, there are problems that brightness of the LED included in the lighting apparatus is not uniformly maintained, and power efficiency of the LED is also degraded.

Accordingly, the development of technologies capable of uniformly maintaining performance of the lighting apparatus even in the case in which the AC power having various magnitudes is applied has been required.

SUMMARY

An object of the present invention is to provide a lighting apparatus capable of uniformly maintaining power consumed by light emitting units even in the case in which various voltages are applied, and increasing power efficiency while minimizing a heating problem by adjusting a reference voltage applied to a connection structure of the light emitting units and a distribution switch according to magnitude of the applied voltage.

According to an exemplary embodiment of the present invention, there is provided a lighting apparatus including: a power supply unit generating alternating current (AC) power; a light emitting unit connected in series with the power supply unit and including a first light emitting unit and a second light emitting unit that each have at least one light emitting diode element that emits light according to an input voltage input from the power supply unit and are connected in series with each other; a voltage detecting unit connected in series with the power supply unit and measuring a voltage value input from the power supply unit; a reference voltage controlling unit selectively controlling a first distribution switch unit and a second distribution switch unit which are separately connected to the first light emitting unit and the second light emitting unit, according to the voltage value measured by the voltage detecting unit; a first variable resistor unit connected between the first distribution switch unit and a ground, and including a variable resistor; a second variable resistor unit connected between the second distribution switch unit and the ground, and including a variable resistor; and a power controlling unit changing resistance values of the variable resistors included in the first variable resistor unit and the second variable resistor unit according to the voltage value measured by the voltage detecting unit to uniformly maintain power consumed by the first light emitting unit and the second light emitting unit.

The power controlling unit may change the resistance values of the variable resistor of the first variable resistor unit and the variable resistor of the second variable resistor unit to the same resistance value when the voltage value measured by the voltage detecting unit is smaller than a switching control reference voltage, and change the resistance values of the variable resistor of the first variable resistor unit and the variable resistor of the second variable resistor unit to different resistance values when the voltage value measured by the voltage detecting unit is greater than the switching control reference voltage.

The first variable resistor unit and the second variable resistor unit may include one or more variable resistors having different variable resistor ranges, and the power controlling unit may select the variable resistor having the same variable resistor range among the variable resistor of the first variable resistor unit and the variable resistor of the second variable resistor unit and changes the resistance values of the variable resistors to the same resistance value when the voltage value measured by the voltage detecting unit is smaller than a switching control reference voltage, and select the variable resistor having different variable resistor ranges among the variable resistor of the first variable resistor unit and the variable resistor of the second variable resistor unit and changes the resistance values of the variable resistors to different resistance values when the voltage value measured by the voltage detecting unit is greater than the switching control reference voltage.

The first distribution switch unit and the second distribution switch unit may include one or more transistors which are turned on at a specific voltage among voltages input from the power supply unit.

The number of the transistors may be equal to the number of light emitting diodes included in the first light emitting unit and the second light emitting unit, respectively.

The first light emitting unit and the second light emitting unit may each include N light emitting groups including a plurality of light emitting diode elements, and the transistors may be connected to a rear stage of each of the N light emitting groups, and have the same number as 2*N, which is the number of the light emitting groups.

The reference voltage controlling unit may change distribution switch reference voltages applied to the first distribution switch unit and the second distribution switch unit according to the voltage value measured by the voltage detecting unit.

The reference voltage controlling unit may supply a first distribution switch reference voltage to the first distribution switch unit and the second distribution switch unit when the voltage value measured by the voltage detecting unit is smaller than a switching control reference voltage.

The reference voltage controlling unit may supply a first distribution switch reference voltage to the first distribution switch unit, and supply a second distribution switch reference voltage having a value greater than the first distribution switch reference voltage to the second distribution switch unit, when the voltage value measured by the voltage detecting unit is greater than a switching control reference voltage.

The reference voltage controlling unit may include a first distribution switch reference voltage supplying unit supplying a first distribution switch reference voltage; and a second distribution switch reference voltage supplying unit supplying a second distribution switch reference voltage having a value greater than the first distribution switch reference voltage.

The first distribution switch unit and the second distribution switch unit may include one or more transistors which are turned on at a specific voltage among voltages input from the power supply unit, and the reference voltage controlling unit may change distribution switch reference voltages applied to the transistors so that the transistors are turned on only at the specific voltage, according to an increase in the voltage value measured by the voltage detecting unit.

The lighting apparatus may further include a switch unit connected in series with between the power supply unit and the second light emitting unit, turned on to connect the first light emitting unit and the second light emitting unit in parallel to each other, when the voltage value measured by the voltage detecting unit is smaller than a switching control reference voltage, and turned off to connect the first light emitting unit and the second light emitting unit in series with each other, when the voltage value measured by the voltage detecting unit is greater than the switching control reference voltage.

The first light emitting unit may include one or more backdraft prevention units connected in series with a rear stage of the light emitting diode element.

The power supply unit may include an AC power generating unit generating an AC waveform; and a rectifying unit rectifying the AC power output from the AC power generating unit.

BRIEF DESCRIPTION OF THE DRAWINGS

FIG. 7 is a diagram illustrating a method for driving a lighting apparatus of a case in which light emitting units of the lighting apparatus are connected in series with each other according to an exemplary embodiment of the present invention.

DETAILED DESCRIPTION

Figure 1:
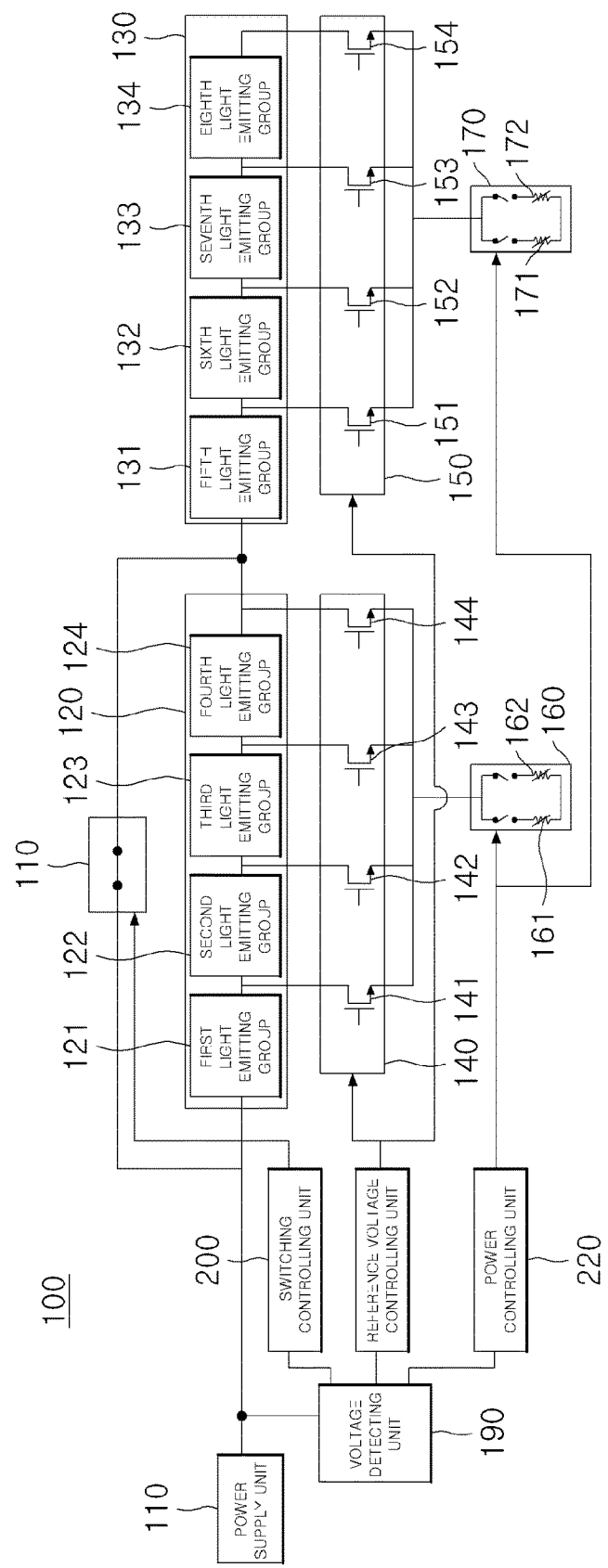
FIG. 1 is a diagram illustrating a lighting apparatus according to an exemplary embodiment of the present invention.

Hereinafter, a lighting apparatus according to exemplary embodiments of the present invention will be described in detail with reference to the accompanying drawings. In the present specification, different exemplary embodiments will be denoted by the same or similar reference numerals and a description thereof will be replaced by a first description.

FIG. 1 is a diagram illustrating a lighting apparatus according to an exemplary embodiment of the present invention.

Referring to FIG. 1, a lighting apparatus 100 includes a power supply unit 110, a first light emitting unit 120, a second light emitting unit 130, a first distribution switch unit 140, a second distribution switch unit 150, a first variable resistor unit 160, a second variable resistor unit 170, a switch unit 180, a voltage detecting unit 190, a switching controlling unit 200, a reference voltage controlling unit 210, and a power controlling unit 220.

The power supply unit 110 may output power having a waveform which is repetitively increased or decreased over time. For example, the power supply unit 110 may include an alternating current (AC) power generating unit (not shown) generating an AC waveform, and a rectifying unit (not shown) rectifying the AC power output from the AC power generating unit.

The power output from the power supply unit 110 flows through the first light emitting unit 120, the second light emitting unit 130, the first distribution switch unit 140, the second distribution switch unit 150, the first variable resistor unit 160, the second variable resistor unit 170, and the switch unit 180.

The power output from the power supply unit 110 may have a period of 100 Hz/120 Hz, and may have a voltage value of 100V/200V/120V/277V/110V/220V. The reason is because the values of the power used in the United States (120V/277V), Japan (100 V/200V), and Korea (110V/220V) are different from each other.

The first light emitting unit 120 may be connected in series with the power supply unit 110, and may include a plurality of light emitting groups 121, 122, 123, and 124. Each of the light emitting groups 121, 122, 123, and 124 may include one or plurality of light emitting diode (LED) elements which are turned on/off according to the voltage output from the power supply unit 110. The LED elements included in the light emitting group may be sequentially turned on as the voltage output from the power supply unit 110 is increased.

The second light emitting unit 130 may be connected in series with the first light emitting unit 120, and may include a plurality of light emitting groups 131, 132, 133, and 134. Each of the light emitting groups 131, 132, 133, and 134 may include one or plurality of light emitting diode (LED) elements which are turned on/off according to the voltage output from the power supply unit 110. The LED elements included in the light emitting group may be sequentially turned on as the voltage output from the power supply unit 110 is increased.

Although the present exemplary embodiment describes the case in which there are two light emitting units 120 and 130, and eight light emitting groups 121, 122, 123, 124, 131, 132, 133, and 134, the number of light emitting units and light emitting groups is not limited thereto, and may be variously implemented.

The first distribution switch unit 140 may be connected to the first light emitting unit 120, and the second distribution switch unit 150 may be connected to the second light emitting unit 130. The first distribution switch unit 140 and the second distribution switch unit 150 may be turned on/off according to an input distribution switch reference voltage and the voltage input from the power supply unit 110.

For example, the first distribution switch unit 140 and the second distribution switch unit 150 may include a transistor. Examples of the transistor include a bipolar transistor (BT), a field effect transistor (FET), an insulated gate bipolar transistor (IGBT), and the like. However, the kind of transistor is not limited thereto.

The transistor may be turned on only at a specific voltage among voltages input from the power supply unit 110, and may be turned off at the remaining voltages. Specifically, for example, the transistor may be turned on only at a voltage of 30V input from the power supply unit 110, and may be turned off at the remaining voltages. The specific voltage may be varied depending on a distribution switch reference voltage VREF.

The number of transistors may be equal to the number of LEDs included in the first light emitting unit 120 and the second light emitting unit 130, respectively.

As another example, the transistor may be connected to a rear stage of each of N light emitting groups included in the first light emitting unit 120 and the second light emitting unit 130, respectively, and the number of transistors may be equal to 2*N, which is the number of the light emitting groups. Since four light emitting groups are included in each of the light emitting units in the present exemplary embodiment, the number of transistors may be eight.

The first variable resistor unit 160 may be connected between the first distribution switch unit 140 and a ground. The first variable resistor unit 160 may include one or more resistors 161 and 162 capable of varying a resistance value, and the respective resistors may have different variable resistance ranges. For example, the first variable resistor unit may include a first variable resistor of which resistance is varied within a first range, and a second variable resistor of which resistance is varied within a second range greater than the first range.

The second variable resistor unit 170 may be connected between the second distribution switch unit 150 and the ground. The second variable resistor unit 170 may include one or more resistors 171 and 172 capable of varying a resistance value, and the respective resistors may have different variable resistance ranges. The second variable resistor unit 170 may include a third variable resistor of which resistance is varied within the first range, and a fourth variable resistor of which resistance is varied within the second range greater than the first range. For example, the third variable resistor may be equal to the first variable resistor, and the fourth variable resistor may be equal to the second variable resistor.

Here, the first variable resistor and the third variable resistor are the resistors used in the case in which the input voltage is smaller than the switch control reference voltage, and the second variable resistor and the fourth variable resistor are the resistors used in the case in which the input voltage is greater than the switch control reference voltage. A detailed description thereof will be provided below with reference to FIGS. 4 to 8.

The switch unit 180 may be connected in series between the power supply unit 110 and the second light emitting unit 130. The switch unit 180 may be turned on/off by the switching controlling unit 200.

For example, in the case in which a voltage value measured by the voltage detecting unit 190 is smaller than the switching control reference voltage, the switch unit 180 may be turned on to connect the first light emitting unit 120 and the second light emitting unit 130 in parallel to each other.

As another example, in the case in which the voltage value measured by the voltage detecting unit 190 is greater than the switching control reference voltage, the switch unit 180 may be turned off to connect the first light emitting unit 120 and the second light emitting unit 130 in series with each other.

The voltage detecting unit 190 may be connected in series with the power supply unit 110, and may measure the voltage value from the power supply unit 110.

For example, the voltage detecting unit 190 may detect the voltage value input from the power supply unit 110, and may output a control voltage signal (e.g., a logic value) according to the detected voltage value. Specifically, for example, the voltage detecting unit 190 may include a peak detecting unit (not shown) and a control signal outputting unit (not shown). The peak detecting unit (not shown) may hold a peak value of the input power to output a peak voltage Vpeak. The control signal outputting unit (not shown) may output a control voltage signal having a first logic value ('high') when the peak voltage is greater than the switching control reference voltage, and may output a control voltage signal having a second logic value ('low') when the peak voltage is smaller than the switching control reference voltage. For example, the control signal outputting unit (not shown) may be implemented as a comparator.

The switching controlling unit 200 may connect the first light emitting unit 120 and the second light emitting unit 130 in series with or in parallel to each other according to the voltage value input from the power supply unit 110.

For example, in the case in which the input voltage value (e.g., 120V) is smaller than the switching control reference voltage (e.g., 140V), the switching controlling unit 200 may turn on the switch unit 180 to connect the first light emitting unit 120 and the second light emitting unit 130 in parallel to each other.

On the other hand, in the case in which the input voltage value (e.g., 277V) is greater than the switching control reference voltage (e.g., 140V), the switching controlling unit 200 may turn off the switch unit 180 to connect the first light emitting unit 120 and the second light emitting unit 130 in series with each other.

As such, the connection of the light emitting units 120 and 130 is changed to the series connection or the parallel connection according to the input voltage value, thereby making it possible to drive the light emitting units 120 and 130 without adding a separate apparatus or changing an internal apparatus even in the case in which the voltages (e.g., 120V/277V) having different magnitudes are input.

The reference voltage controlling unit 210 may change the distribution switch reference voltage applied to the first distribution switch unit 140 or the second distribution switch unit 150 according to the voltage value measured by the voltage detecting unit 190.

For example, the reference voltage controlling unit 210 may change the distribution switch reference voltage applied to the transistor so that the transistor is turned on only at a specific voltage, according to the voltage value measured by the voltage detecting unit 190. In the case in which the measured voltage value is smaller than the switching control reference voltage, the reference voltage controlling unit 210 may apply the distribution switch reference voltage of 0.5V to the transistor so that the transistor is turned on at 30V. Alternatively, in the case in which the measured voltage value is smaller than the switching control reference voltage, the reference voltage controlling unit 210 may apply the distribution switch reference voltage of 1.0V to the transistor so that the transistor is turned on at 60V. As such, the reference voltage controlling unit 210 may change the distribution switch reference voltage so that the transistor is turned on only at the specific voltage.

The reference voltage controlling unit 210 may include a first distribution switch reference voltage supplying unit supplying a first distribution switch reference voltage and a second distribution switch reference voltage supplying unit supplying a second distribution switch reference voltage having a value greater than the first distribution switch reference voltage.

For example, in the case in which the input voltage value is smaller than the switching control reference voltage, the reference voltage controlling unit 210 supplies the first distribution switch reference voltage to the first distribution switch unit 140 and the second distribution switch unit 150.

On the other hand, in the case in which the measured voltage value is greater than the switching control reference voltage, the reference voltage controlling unit 210 supplies the first distribution switch reference voltage to the first distribution switch unit 140, and supplies the second distribution switch reference voltage having a value greater than the first distribution switch reference value to the second distribution switch unit 150.

The power controlling unit 220 changes resistance values of the variable resistors included in the first variable resistor unit 160 and the second variable resistor unit 170 according to the input voltage value, thereby making it possible to uniformly maintain power consumed by the first light emitting unit 120 and the second light emitting unit 130.

Table 1 is to describe the case in which the power controlling unit 220 controls the variable resistor units 160 and 170 to uniformly maintain the consumption power of the light emitting units 120 and 130. Numerical values of Table 1 are denoted for the purpose of description, and detailed numerical values may be changed according to an implementation situation.

TABLE 1

|  | 180 V | 210 V | 240 V | 277 V |
|---|---|---|---|---|
| Variable resistor unit [Ω] | 24 | 30 | 33 | 41 |
| Consumption Power [W] | 30.1 | 29.9 | 29.8 | 30.1 |

Referring to Table 1, in the case in which the input voltage value is 180V, the power controlling unit 220 changes the variable resistor units 160 and 170 to 24[Ω], thereby making it possible to maintain the consumption power of the light emitting units 120 and 130 at 30.1[W].

In addition, in the case in which the input voltage value is 277V, the power controlling unit 220 changes the variable resistor units 160 and 170 to 41[Ω], thereby making it possible to maintain the consumption power of the light emitting units 120 and 130 at 30.1[W].

As such, even though the input voltage value is changed, the power controlling unit 220 varies magnitudes of resistances of the variable resistor units 160 and 170 to uniformly maintain the consumption power of the light emitting units 120 and 130. Accordingly, the lighting apparatus 100 may uniformly maintain an overall consumption power even though the input voltage value is changed.

In the case in which the voltage value measured by the voltage detecting unit 190 is smaller than the switching control reference voltage, the first light emitting unit 120 and the second light emitting unit 130 are connected in parallel to each other, and the power controlling unit 220 changes the resistance values of the variable resistor of the first variable resistor unit 160 and the variable resistor of the second variable resistor unit 170 to the same resistance value (e.g., 24Ω).

On the other hand, in the case in which the voltage value measured by the voltage detecting unit 190 is greater than the switching control reference voltage, the first light emitting unit 120 and the second light emitting unit 130 are connected in series with to each other, and the power controlling unit 220 changes the resistance values of the variable resistor of the first variable resistor unit 160 and the variable resistor of the second variable resistor unit 170 to different resistance values. For example, the power controlling unit 220 may change the resistance value (e.g., 24Ω) of the variable resistor of the first variable resistor unit 160 so as to be smaller than the resistance value (e.g., 41Ω) of the variable resistor of the second variable resistor unit 170.

Hereinafter, it is assumed that the first variable resistor unit 160 and the second variable resistor unit 170 include one or more variable resistors having different variable resistance ranges.

In the case in which the voltage value measured by the voltage detecting unit 190 is smaller than the switching control reference voltage, the first light emitting unit 120 and the second light emitting unit 130 are connected in parallel to each other, and the power controlling unit 220 selects the variable resistor including 24Ω in the variable resistance range from the first variable resistor unit 160 and the second variable resistor unit 170. Next, the power controlling unit 220 may change the resistance values of the variable resistor of the first variable resistor unit 160 and the resistance value of the variable resistor of the second variable resistor unit 170 to the same resistance value (e.g., 24Ω).

In the case in which the voltage value measured by the voltage detecting unit 190 is greater than the switching control reference voltage, the power controlling unit 220 may select the variable resistor having different variable resistance ranges among the variable resistor of the first variable resistor unit 160 and the variable resistor of the second variable resistor unit 170, and may change the resistance values of the variable resistors to different resistance values.

For example, the first light emitting unit 120 and the second light emitting unit 130 are connected in series with each other, and the power controlling unit 220 selects the variable resistor including 24Ω in the variable resistance range from the first variable resistor unit 160, and selects the variable resistor including 41Ω in the variable resistance range from the second variable resistor unit 170. Next, the power controlling unit 220 may change the resistance value of the variable resistor selected from the first variable resistor unit 160 to 24Ω, and changes the resistance value of the variable resistor selected from the second variable resistor unit 170 to 41Ω.

According to an exemplary embodiment of the present invention, even in the case in which the magnitude of the applied voltage is changed, the magnitude of the resistance of the variable resistor unit is adjusted, thereby making it possible to uniformly maintain the power consumed by the light emitting units.

Further, the distribution switch reference voltage applied to the distribution switch unit is changed according to the magnitude of the applied voltage, thereby making it possible to significantly reduce a heating problem by optimizing driving of the LED connected to the distribution switch unit.

FIGS. 2A to 2D are diagrams illustrating a method for driving a lighting apparatus according to an exemplary embodiment of the present invention, when an input voltage is smaller than a switching control reference voltage.

Figure 2A:
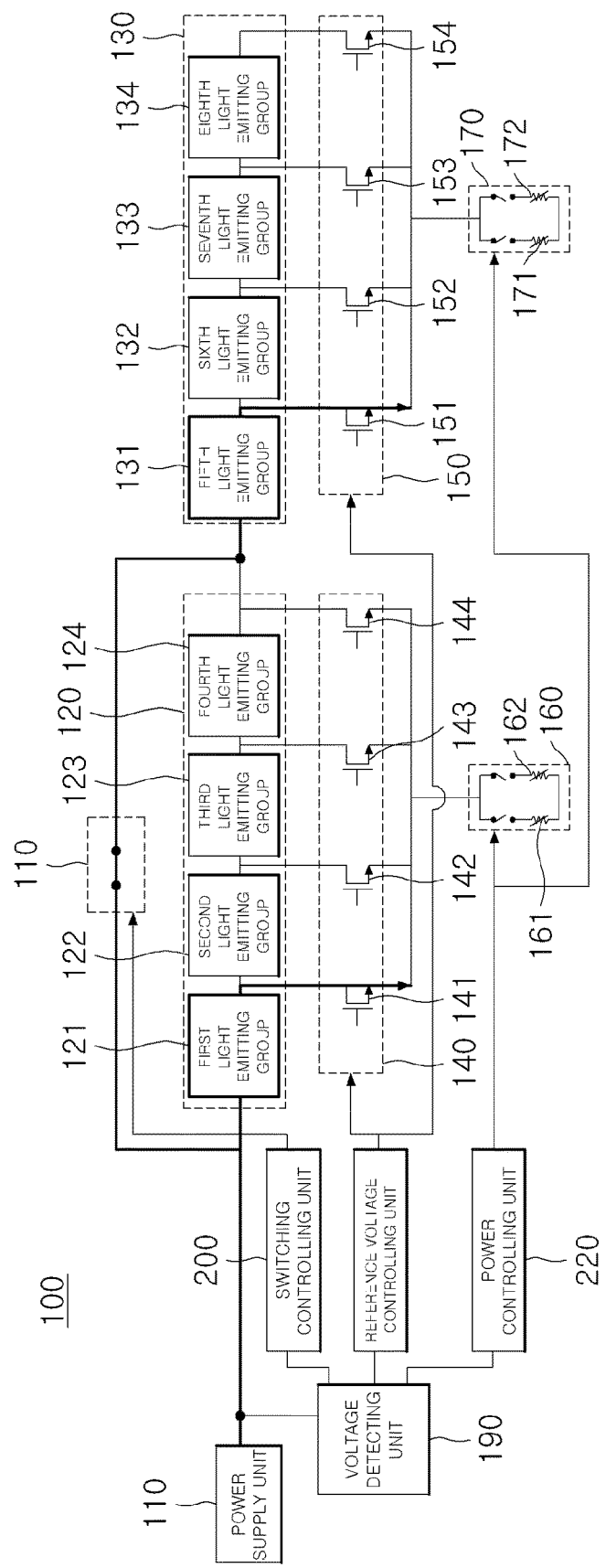
FIGS. 2A to 2D are diagrams illustrating a method for driving a lighting apparatus according to an exemplary embodiment of the present invention, when an input voltage is smaller than a switching control reference voltage.

Referring to FIGS. 1 and 2A, in the case in which the input voltage value (e.g., 120V) is smaller than the switching control reference voltage (e.g., 140V), the switching controlling unit 200 may turn on the switch unit 180 to connect the first light emitting unit 120 and the second light emitting unit 130 in parallel to each other. In this case, the power applied from the power supply unit 110 flows through the first light emitting unit 120 and the second light emitting unit 130 which are connected parallel to each other.

The reference voltage controlling unit 210 supplies each of the first distribution switch reference voltages (0.5V, 1.0V, 1.5V, and 2.0V) to the first distribution switch unit 140 and the second distribution switch unit 150. In the case in which the distribution switch reference voltage is 0.5V/1.0V/1.5V/2.0V, the distribution switch is turned on only when the input voltage is 30V/60V/90V/120V. The respective distribution switches are turned off at voltages other than the respective specific voltages. The above-mentioned numerical values are merely examples, and may be variously set.

Hereinafter, the lighting apparatus which is driven as the input voltage is sequentially increased will be described.

Referring to FIGS. 1 and 2A, in the case in which the input voltage value is 30V, a first distribution switch 141 connected to a rear stage of a first light emitting group 121 and a fifth distribution switch 151 connected to a rear stage of a fifth light emitting group 131 are only turned on. The remaining distribution switches are turned off. Accordingly, the power applied from the power supply unit 110 flows through the first light emitting group 121 and the first distribution switch 141/the fifth light emitting group 131 and the fifth distribution switch 151 which are connected in parallel to each other.

Figure 2B:
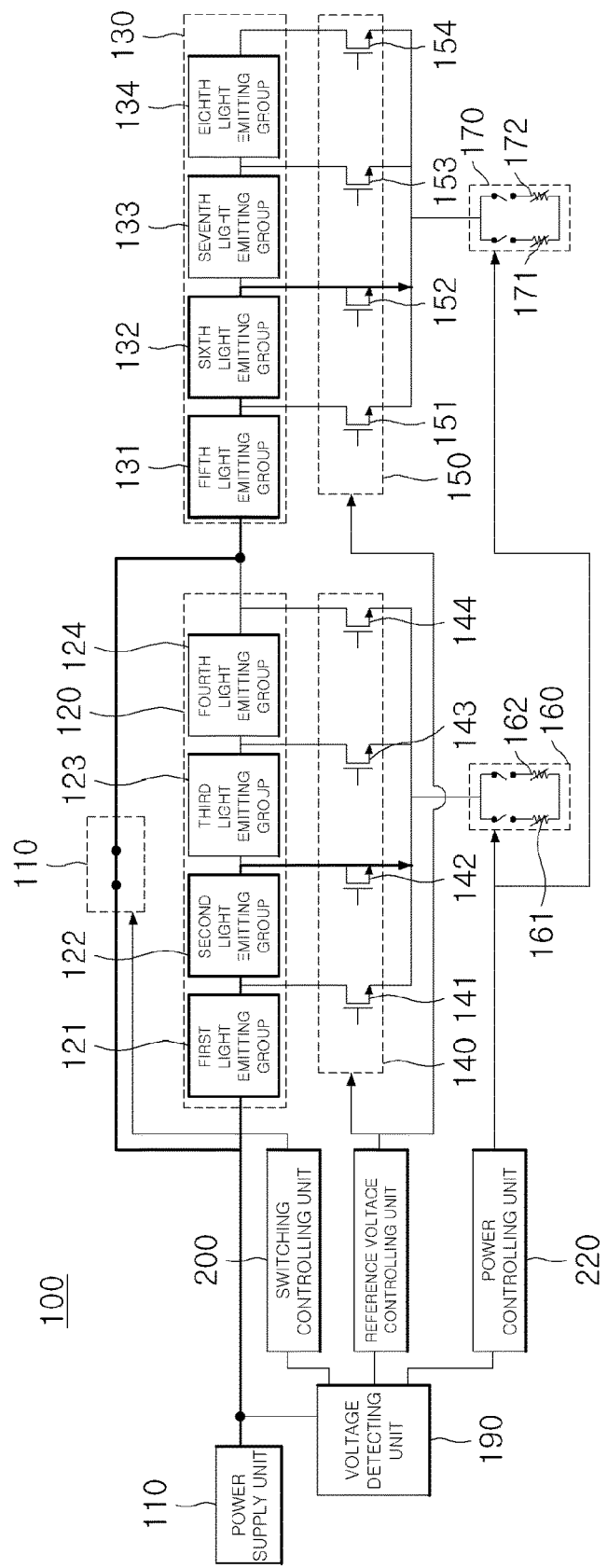

Referring to FIGS. 1 and 2B, in the case in which the input voltage value is 60V, a second distribution switch 142 connected to a rear stage of a second light emitting group 122 and a sixth distribution switch 152 connected to a rear stage of a sixth light emitting group 132 are only turned on. The remaining distribution switches are turned off. Accordingly, the power applied from the power supply unit 110 flows through the first light emitting group 121, the second light emitting group 122 and the second distribution switch 142/the fifth light emitting group 131, the sixth light emitting group 132 and the sixth distribution switch 152 which are connected in parallel to each other.

Figure 2C:
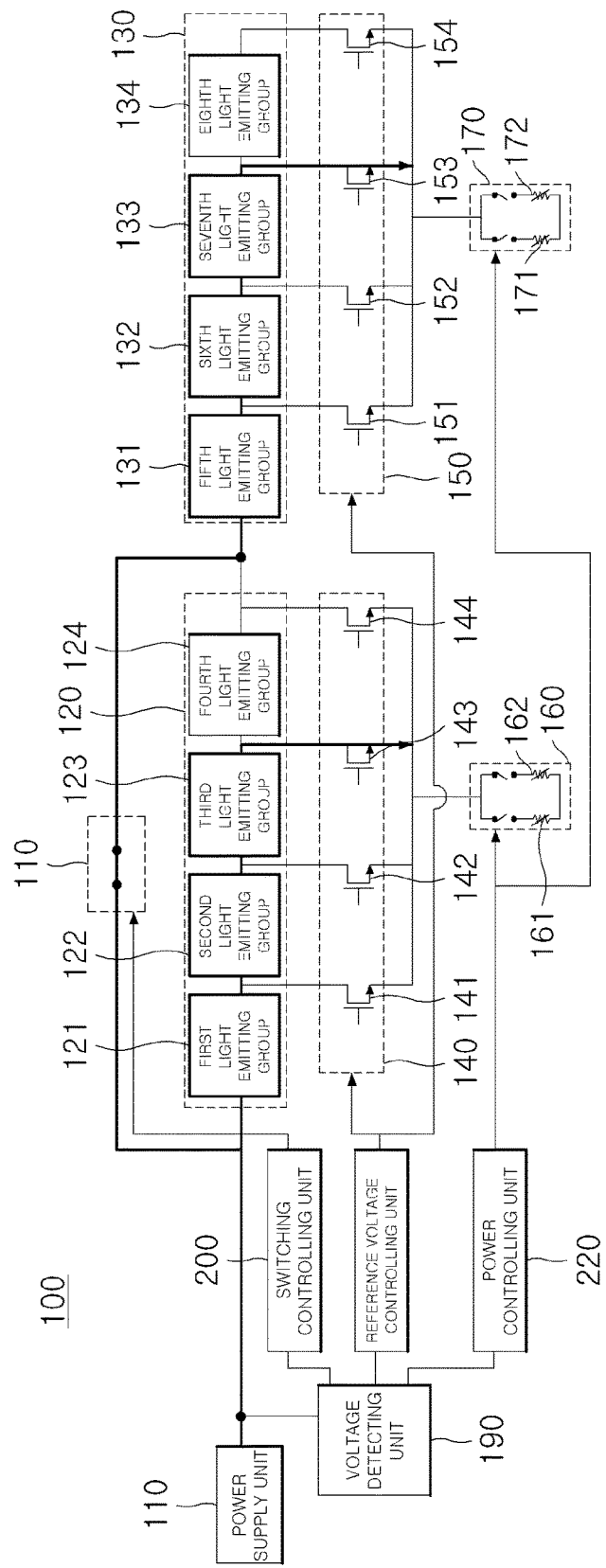

Referring to FIGS. 1 and 2C, in the case in which the input voltage value is 90V, a third distribution switch 143 connected to a rear stage of a third light emitting group 123 and a seventh distribution switch 153 connected to a rear stage of a seventh light emitting group 133 are only turned on. The remaining distribution switches are turned off. Accordingly, the power applied from the power supply unit 110 flows through the first light emitting group 121, the second light emitting group 122, the third light emitting group 123 and the third distribution switch 143/the fifth light emitting group 131, the sixth light emitting group 132, the seventh light emitting group 133 and the seventh distribution switch 153 which are connected in parallel to each other.

Figure 2D:
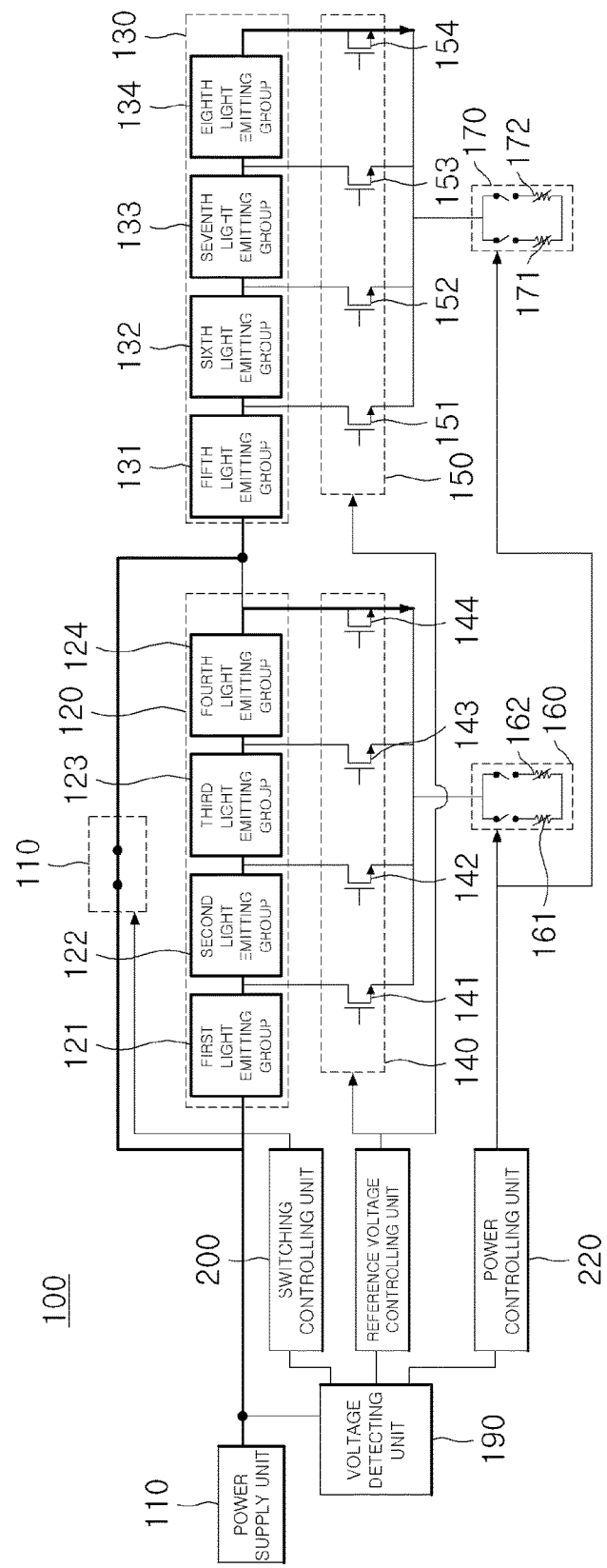

Referring to FIGS. 1 and 2D, in the case in which the input voltage value is 120V, a fourth distribution switch 144 connected to a rear stage of a fourth light emitting group 124 and an eighth distribution switch 154 connected to a rear stage of an eighth light emitting group 134 are only turned on. The remaining distribution switches are turned off. Accordingly, the power applied from the power supply unit 110 flows through the first light emitting group 121, the second light emitting group 122, the third light emitting group 123, the fourth light emitting group 124 and the fourth distribution switch 144/the fifth light emitting group 131, the sixth light emitting group 132, the seventh light emitting group 133, the eighth light emitting group 134 and the eighth distribution switch 154 which are connected in parallel to each other.

If it is assumed that the first light emitting unit 120 and the second light emitting unit 130 each include N light emitting groups, in the case in which the input voltage is smaller than the switching control reference voltage, the first light emitting unit 120 forms N channels and the second light emitting unit 130 forms N channels.

FIGS. 3A to 3D are diagrams illustrating a method for driving a lighting apparatus according to an exemplary embodiment of the present invention, when an input voltage is greater than a switching control reference voltage.

Figure 3A:
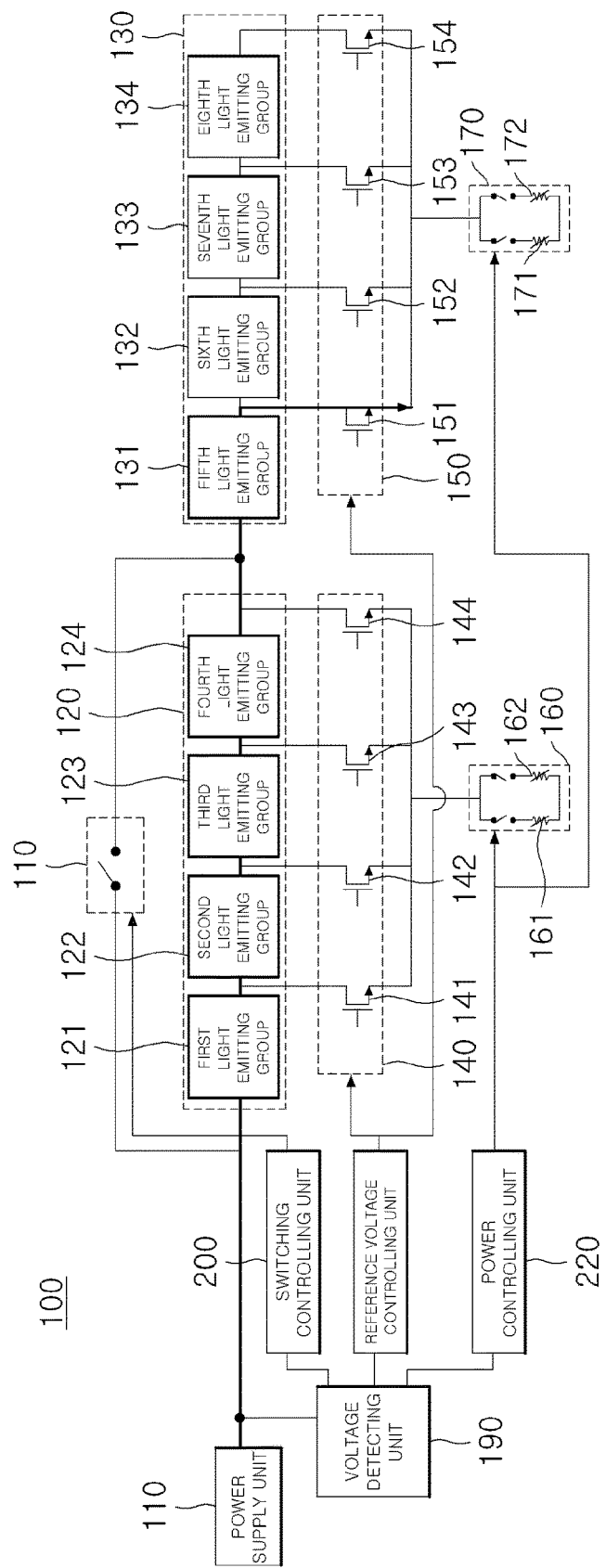
FIGS. 3A to 3D are diagrams illustrating a method for driving a lighting apparatus according to an exemplary embodiment of the present invention, when an input voltage is greater than a switching control reference voltage.

Referring to FIGS. 1 and 3A, in the case in which the input voltage value (e.g., 250V) is greater than the switching control reference voltage (e.g., 140V), the switching controlling unit 200 may turn off the switch unit 180 to connect the first light emitting unit 120 and the second light emitting unit 130 in series with each other. In this case, the power applied from the power supply unit 110 flows through the first light emitting unit 120 and the second light emitting unit 130 which are connected in series with each other.

The reference voltage controlling unit 210 supplies the first distribution switch reference voltages (0.5V, 1.0V, 1.5V, and 2.0V) to the first distribution switch unit 140 and each supplies the second distribution switch reference voltages (2.5V, 3.0V, 3.5V, and 4.0V) to the second distribution switch unit 130. In the case in which the distribution switch reference voltage is 0.5V/1.0V/1.5V/2.0V/2.5V/3.0V/3.5V/4.0V, the distribution switch is turned on only when the input voltage is 30V/60V/90V/120V/150V/180V/210V/240V. The respective distribution switches are turned off at voltages other than the respective specific voltages.

Hereinafter, the lighting apparatus which is driven as the input voltage is sequentially increased will be described.

In the case in which the input voltage is 30V/60V/90V/120V, since the lighting apparatus is driven by the same method as the first light emitting unit 120 of FIGS. 2A to 2D, a description thereof will be omitted.

Referring to FIGS. 1 and 3A, in the case in which the input voltage value is 150V, the fifth distribution switch 151 connected to the rear stage of the fifth light emitting group 131 is only turned on. Accordingly, the power applied from the power supply unit 110 flows through the first light emitting group 121, the second light emitting group 122, the third light emitting group 123, the fourth light emitting group 124, the fifth light emitting group 131 and the fifth distribution switch 151.

Figure 3B:
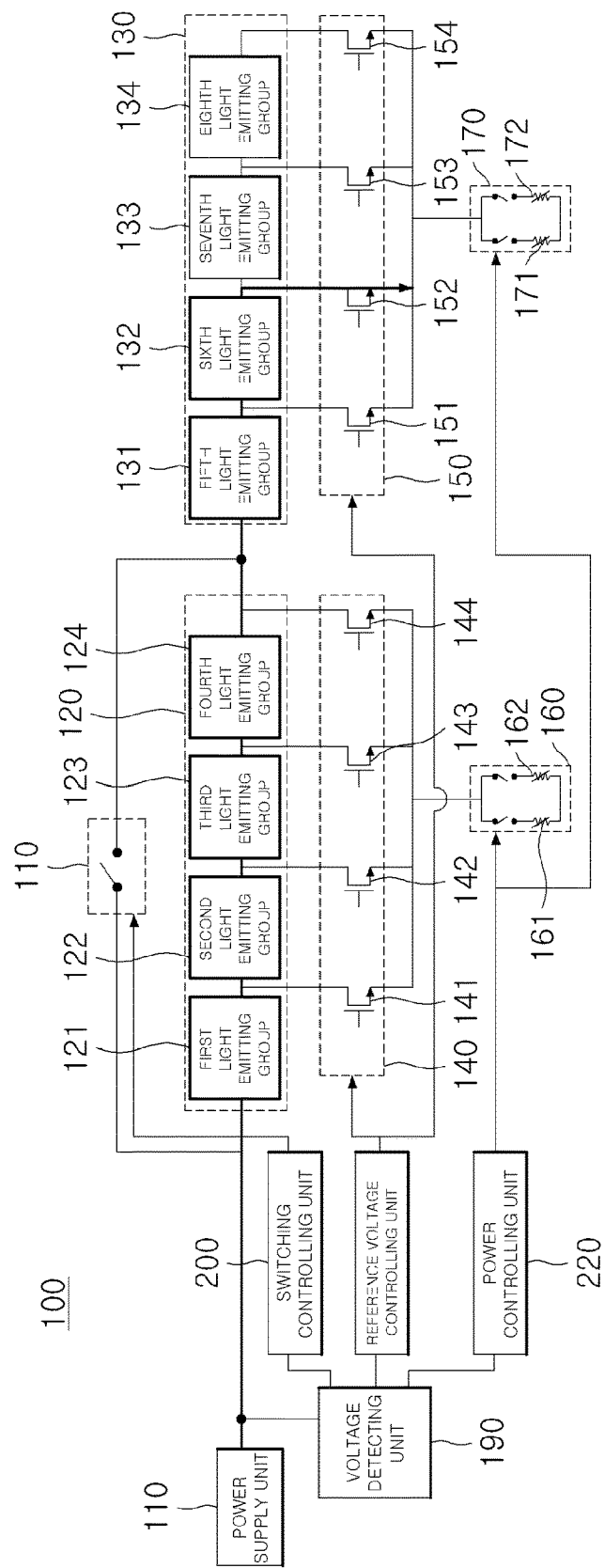

Referring to FIGS. 1 and 3B, in the case in which the input voltage value is 180V, the sixth distribution switch 152 connected to the rear stage of the sixth light emitting group 132 is only turned on. Accordingly, the power applied from the power supply unit 110 flows through the first light emitting group 121, the second light emitting group 122, the third light emitting group 123, the fourth light emitting group 124, the fifth light emitting group 131, the sixth light emitting group 132 and the sixth distribution switch 152.

Figure 3C:
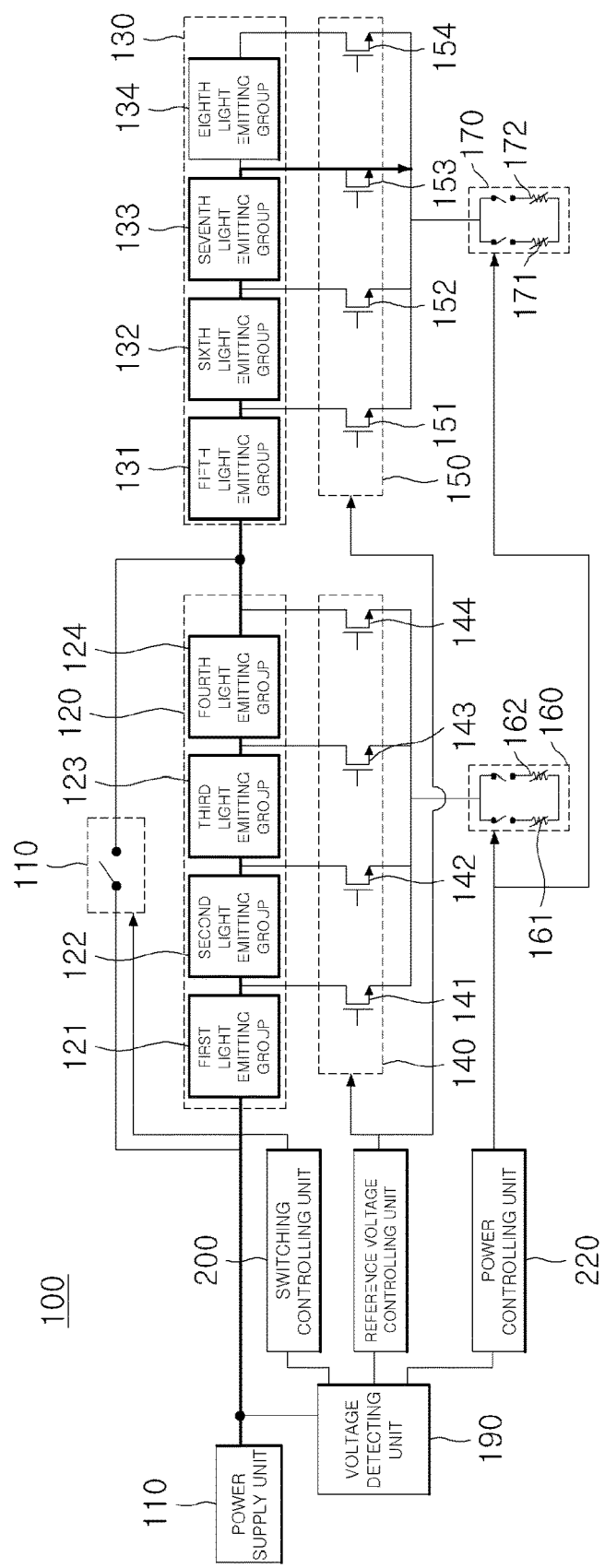

Referring to FIGS. 1 and 3C, in the case in which the input voltage value is 210V, the seventh distribution switch 153 connected to the rear stage of the seventh light emitting group 133 is only turned on. Accordingly, the power applied from the power supply unit 110 flows through the first light emitting group 121, the second light emitting group 122, the third light emitting group 123, the fourth light emitting group 124, the fifth light emitting group 131, the sixth light emitting group 132, the seventh light emitting group 133 and the seventh distribution switch 153.

Figure 3D:
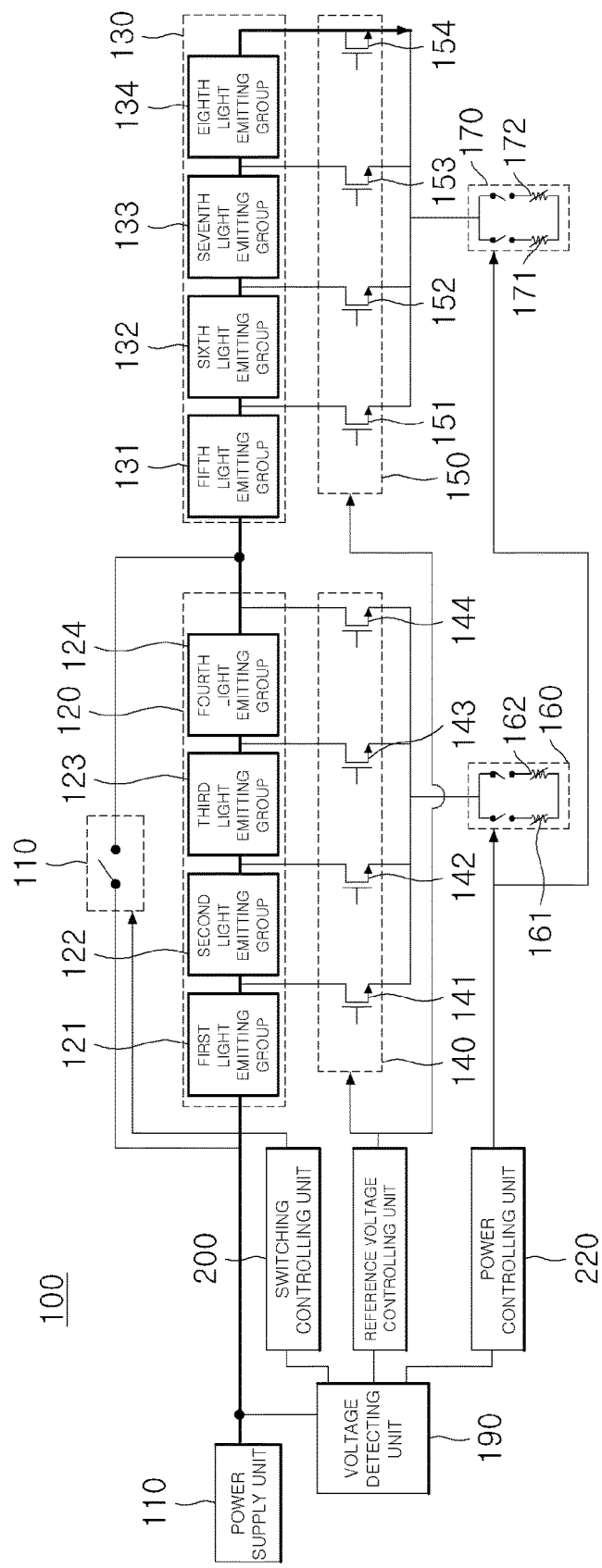

Referring to FIGS. 1 and 3D, in the case in which the input voltage value is 240V, the eighth distribution switch 154 connected to the rear stage of the eighth light emitting group 134 is only turned on. Accordingly, the power applied from the power supply unit 110 flows through the first light emitting group 121, the second light emitting group 122, the third light emitting group 123, the fourth light emitting group 124, the fifth light emitting group 131, the sixth light emitting group 132, the seventh light emitting group 133, the eighth light emitting group 134 and the eighth distribution switch 154.

If it is assumed that the first light emitting unit 120 and the second light emitting unit 130 each include N light emitting groups, in the case in which the input voltage is greater than the switching control reference voltage, since the first light emitting unit 120 and the second light emitting unit 130 are connected in series with each other, the first light emitting unit 120 and the second light emitting unit 130 form 2*N channels.

Figure 4:
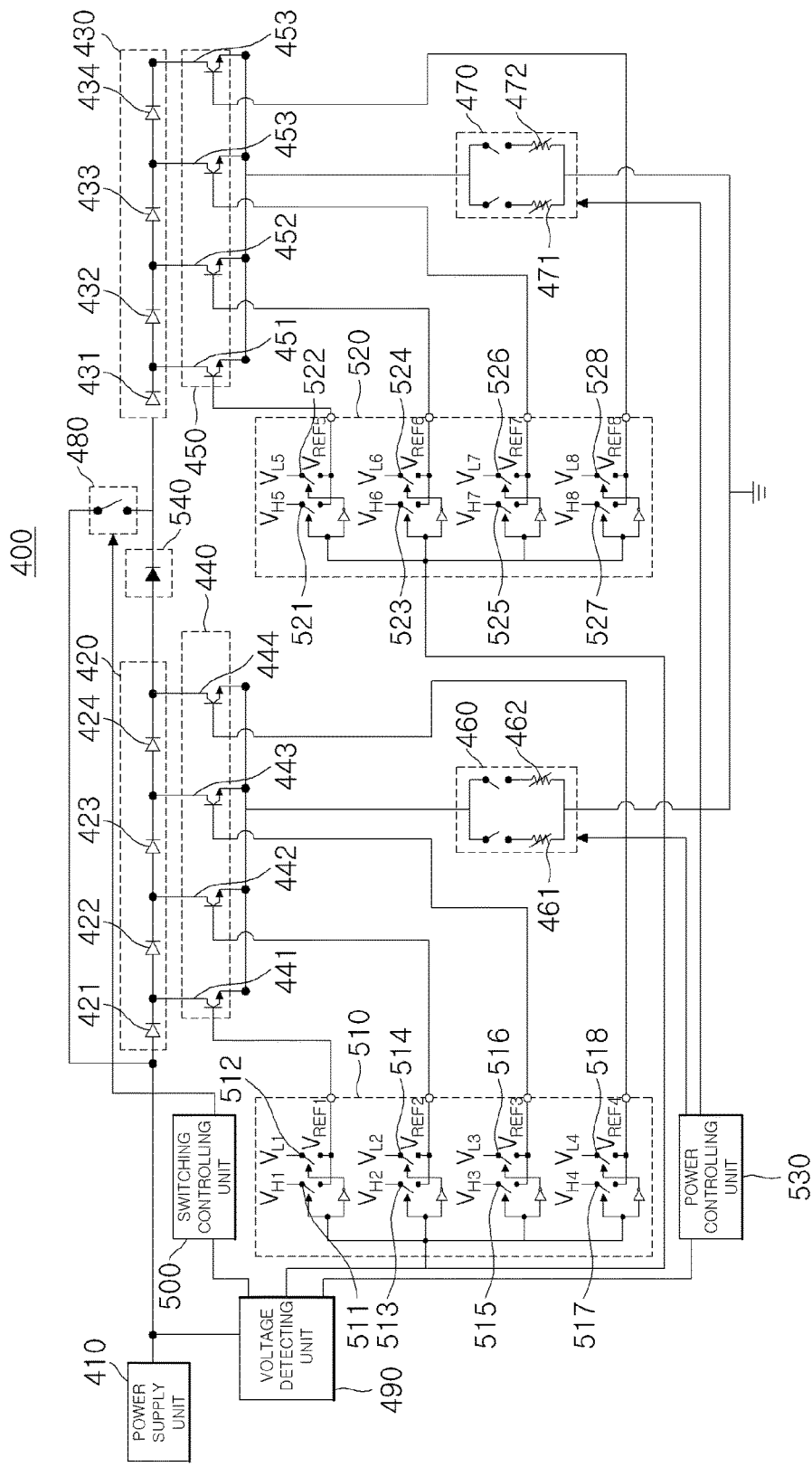
FIG. 4 is a detailed circuit diagram of the lighting apparatus according to an exemplary embodiment of the present invention.

FIG. 4 is a detailed circuit diagram of the lighting apparatus according to an exemplary embodiment of the present invention.

Referring to FIG. 4, a lighting apparatus 400 includes a power supply unit 410, a first light emitting unit 420, a second light emitting unit 430, a first distribution switch unit 440, a second distribution switch unit 450, a first variable resistor unit 460, a second variable resistor unit 470, a switch unit 480, a voltage detecting unit 490, a switching controlling unit 500, a first distribution switch reference voltage controlling unit 510, a second distribution switch reference voltage controlling unit 520, and a power controlling unit 530.

The power supply unit 410 may output power having a waveform which is repetitively increased or decreased over time.

The first light emitting unit 420 includes a first light emitting group 421, a second light emitting group 422, a third light emitting group 423, and a fourth light emitting group 424, and the second light emitting unit 430 also includes a fifth light emitting group 431, a sixth light emitting group 432, a seventh light emitting group 433, and an eighth light emitting group 434. Although the present exemplary embodiment is described based on the case in which the light emitting units 420 and 430 each include four light emitting groups, and the respective light emitting groups include two light emitting diode elements, the number of the light emitting diode elements is not limited thereto.

The first light emitting unit 420 may include a backdraft prevention unit 425 connected between the fourth light emitting group 424 and the second light emitting unit 430. One or more backdraft prevention units 425 may be included, and may prevent the backdraft of current.

The first distribution switch unit 440 may be connected between the first light emitting unit 420 and the first variable resistor unit 460, and the second distribution switch unit 450 may be connected between the second light emitting unit 430 and the second variable resistor unit 470.

Specifically, the first distribution switch unit 440 includes a first transistor 441, a second transistor 442, a third transistor 443, and a fourth transistor 444, and the second distribution switch unit 450 includes a fifth transistor 451, a sixth transistor 452, a seventh transistor 453, and an eighth transistor 454.

The first variable resistor unit 460 may be connected between the first distribution switch unit 440 and a ground. The first variable resistor unit 460 may include a first variable resistor 416 of which resistance is varied within a first range, and a second variable resistor 462 of which resistance is varied within a second range greater than the first range.

The second variable resistor unit 470 may be connected between the second distribution switch unit 450 and the ground. The second variable resistor unit 470 may include a third variable resistor 471 of which resistance is varied within the first range, and a fourth variable resistor 472 of which resistance is varied within the second range greater than the first range. The first variable resistor 461 and the third variable resistor 471 are used in the case in which the input voltage is smaller than the switch control reference voltage, and the second variable resistor 462 and the fourth variable resistor 472 are used in the case in which the input voltage is greater than the switch control reference voltage.

The switch unit 480 may be connected between the power supply unit 410 and the second light emitting unit 430. The switch unit 480 may be turned on/off by the switching controlling unit 500.

The voltage detecting unit 490 may detect the voltage value input from the power supply unit 410, and may output a control voltage signal (e.g., a logic value) according to the detected voltage value.

The switching controlling unit 500 may connect the first light emitting unit 420 and the second light emitting unit 430 in series with or in parallel to each other according to the voltage value input from the power supply unit 410.

The first reference voltage controlling unit 510 may change the distribution switch reference voltage applied to the first distribution switch unit 440 according to the input voltage value. The first reference voltage controlling unit 510 may include a first distribution switch reference voltage supplying unit and a second distribution switch reference voltage supplying unit. The first distribution switch reference voltages ($V_{L1}$, $V_{L2}$, $V_{L3}$, and $V_{L4}$) of the first reference voltage supplying unit may have values smaller than the second distribution switch reference voltages ($V_{H1}$, $V_{H2}$, $V_{H3}$, and $V_{H4}$) of the second reference voltage supplying unit. For example, the first distribution switch reference voltages ($V_{L1}$, $V_{L2}$, $V_{L3}$, and $V_{L4}$) of the first reference voltage supplying unit may have distribution switch reference voltage values of 0.4V, 0.7V, 1.0V, and 1.3V, and the second distribution switch reference voltages ($V_{H1}$, $V_{H2}$, $V_{H3}$, and $V_{H4}$) of the second reference voltage supplying unit may have distribution switch reference voltage values of 1.6V, 1.9V, 2.2V, and 2.5V.

The second reference voltage controlling unit 520 may change the distribution switch reference voltage applied to the second distribution switch unit 450 according to the input voltage value. The second reference voltage controlling unit 520 may include a third distribution switch reference voltage supplying unit and a fourth distribution switch reference voltage supplying unit. The third distribution switch reference voltages ($V_{L5}$, $V_{L6}$, $V_{L7}$, and $V_{L8}$) of the third reference voltage supplying unit may have values smaller than the fourth distribution switch reference voltages ($V_{H5}$, $V_{H6}$, $V_{H7}$, and $V_{H8}$) of the fourth reference voltage supplying unit. For example, the third distribution switch reference voltages ($V_{L5}$, $V_{L6}$, $V_{L7}$, and $V_{L8}$) of the third reference voltage supplying unit may have distribution switch reference voltage values of 0.4V, 0.7V, 1.0V, and 1.3V, and the fourth distribution switch reference voltages ($V_{H5}$, $V_{H6}$, $V_{H7}$, and $V_{H8}$) of the fourth reference voltage supplying unit may have distribution switch reference voltage values of 1.6V, 1.9V, 2.2V, and 2.5V.

For example, in the case in which the input voltage value is smaller than the switching control reference voltage, the switching controlling unit 500 may turn on the switch unit 480 to connect the first light emitting unit 420 and the second light emitting unit 430 in parallel to each other, and the reference voltage controlling unit 510 may supply the reference voltages ($V_{L1}$, $V_{L2}$, $V_{L3}$, and $V_{L4}$) of the first reference voltage supplying unit to the first distribution switch unit 440, and supply the reference voltages ($V_{L5}$, $V_{L6}$, $V_{L7}$, and $V_{L8}$) of the third reference voltage supplying unit to the second distribution switch unit 450.

On the other hand, in the case in which the input voltage value is greater than the switching control reference voltage, the switching controlling unit 500 may turn off the switch unit 480 to connect the first light emitting unit 420 and the second light emitting unit 430 in series with each other, and the reference voltage controlling unit 510 may supply the first distribution switch reference voltages ($V_{L1}$, $V_{L2}$, $V_{L3}$, and $V_{L4}$) of the first reference voltage supplying unit to the first distribution switch unit 440, and supply the fourth distribution switch reference voltages ($V_{H5}$, $V_{H6}$, $V_{H7}$, and $V_{H8}$) of the fourth reference voltage supplying unit to the second distribution switch unit 450.

The power controlling unit 530 changes resistors of the first variable resistor unit 460 and the second variable resistor unit 470 according to the input voltage value, thereby making it possible to uniformly maintain output power of the first light emitting unit 420 and the second light emitting unit 430.

For example, in the case in which the input voltage value is greater than the switching control reference voltage, the power controlling unit 530 may connect the second variable resistor 462 included in the first variable resistor unit 460 to the first distribution switch unit 440, or may connect the fourth variable resistor 472 included in the second variable resistor unit 470 to the second distribution switch unit 450. Next, the power controlling unit 530 changes the second variable resistor 462 or the fourth variable resistor 472, thereby making it possible to uniformly maintain the output power of the first light emitting unit 420 or the second light emitting unit 430.

As another example, in the case in which the input voltage value is smaller than the switching control reference voltage, the power controlling unit 530 may connect the first variable resistor 461 included in the first variable resistor unit 460 to the first distribution switch unit 440, and may connect the third variable resistor 471 included in the second variable resistor unit 470 to the second distribution switch unit 450. Next, the power controlling unit 530 changes the first variable resistor 461 or the third variable resistor 471, thereby making it possible to uniformly maintain the output power of the first light emitting unit 420 and the second light emitting unit 430.

Figure 5:
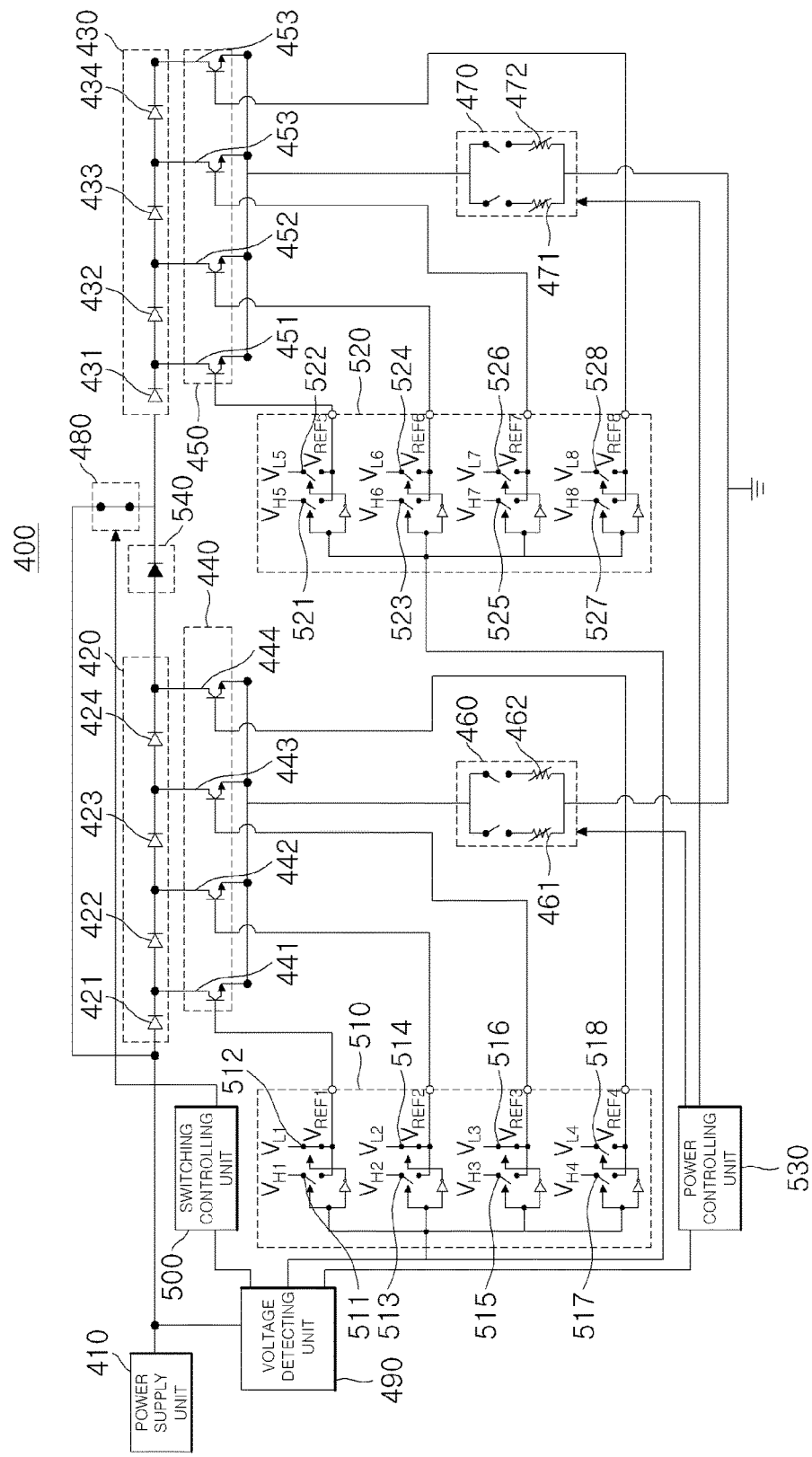
FIG. 5 is a diagram illustrating a method for driving a lighting apparatus of a case in which light emitting units of the lighting apparatus are connected in parallel to each other according to an exemplary embodiment of the present invention.

FIG. 5 is a diagram illustrating a method for driving a lighting apparatus of a case in which light emitting units of the lighting apparatus are connected in parallel to each other according to an exemplary embodiment of the present invention.

Referring to FIGS. 4 and 5, in the case in which the voltage input from the power supply unit 410 is smaller than the switching control reference voltage value, the switching controlling unit 500 may turn on the switch unit 480 to connect the first light emitting unit 420 and the second light emitting unit 430 in parallel to each other.

In this case, a first current I1A flows in the first transistor 441 of the first distribution switch unit 440, a second current I2A flows in the second transistor 442, a third current I3A flows in the third transistor 443, and a fourth current I4A flows in the fourth transistor 444.

A fifth current I1B flows in the fifth transistor 451 of the second distribution switch unit 450, a sixth current I2B flows in the sixth transistor 452, a seventh current I3B flows in the seventh transistor 453, and an eighth current I4B flows in the eighth transistor 454.

In this case, the first light emitting unit 420 forms four channels ('four light emitting diode elements'), and the second light emitting unit 430 forms four channels ('four light emitting diode elements').

Since the input voltage value is smaller than the switching control reference voltage, the first reference voltage controlling unit 510 turns on the switches 512, 514, 516, and 518 so that the voltages ($V_{L1}$, $V_{L2}$, $V_{L3}$, and $V_{L4}$) of the first reference voltage supplying unit are applied to the first distribution switch unit 440. In this case, the voltages ($V_{L1}$, $V_{L2}$, $V_{L3}$, and $V_{L4}$) of the first reference voltage supplying unit are applied to each of the first transistor 441, the second transistor 442, the third transistor 443, and the fourth transistor 444.

The second reference voltage controlling unit 520 turns on the switches 521, 523, 525, and 527 so that the voltages ($V_{L5}$, $V_{L6}$, $V_{L7}$, and $V_{L8}$) of the third reference voltage supplying unit are applied to the second distribution switch unit 450. In this case, the voltages ($V_{L5}$, $V_{L6}$, $V_{L7}$, and $V_{L8}$) of the third reference voltage supplying unit are applied to each of the fifth transistor 451, the sixth transistor 452, the seventh transistor 453, and the eighth transistor 454.

The power controlling unit 530 changes resistances of the first variable resistor unit 460 and the second variable resistor unit 470 according to the input voltage value, thereby making it possible to uniformly maintain output power of the first light emitting unit 420 and the second light emitting unit 430.

Figure 6A:
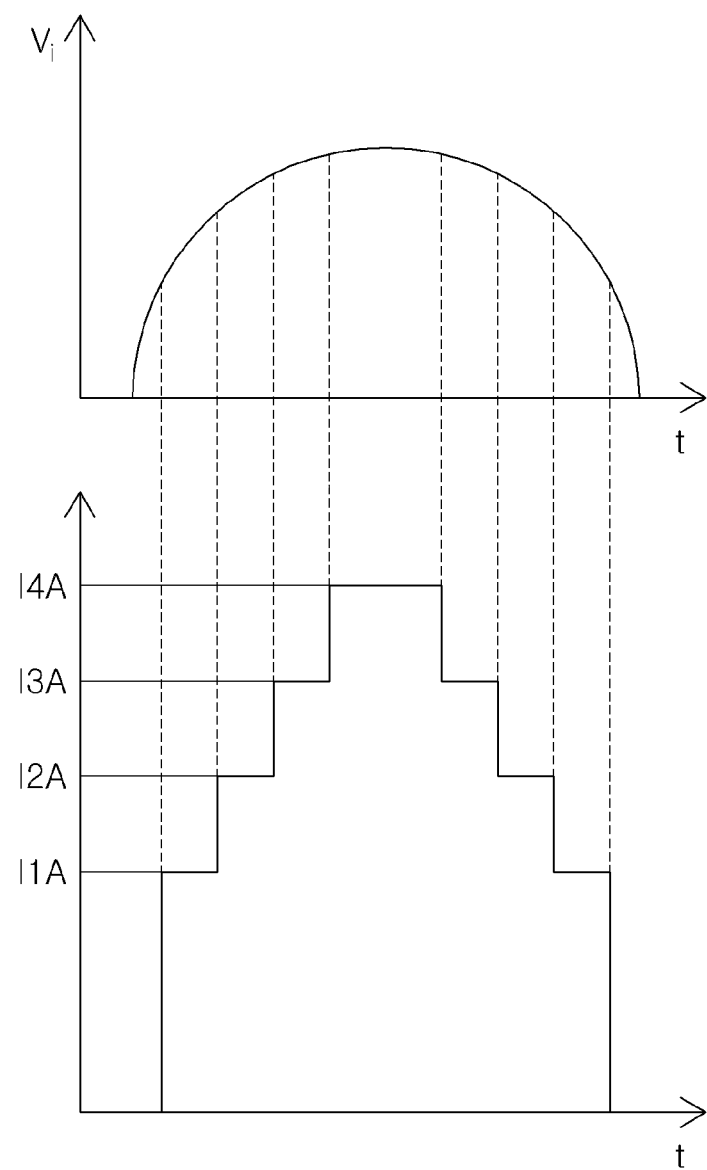
FIGS. 6A and 6B are diagrams illustrating currents flowing in a distribution switch unit according to the exemplary embodiment of FIG. 5.
Figure 6B:
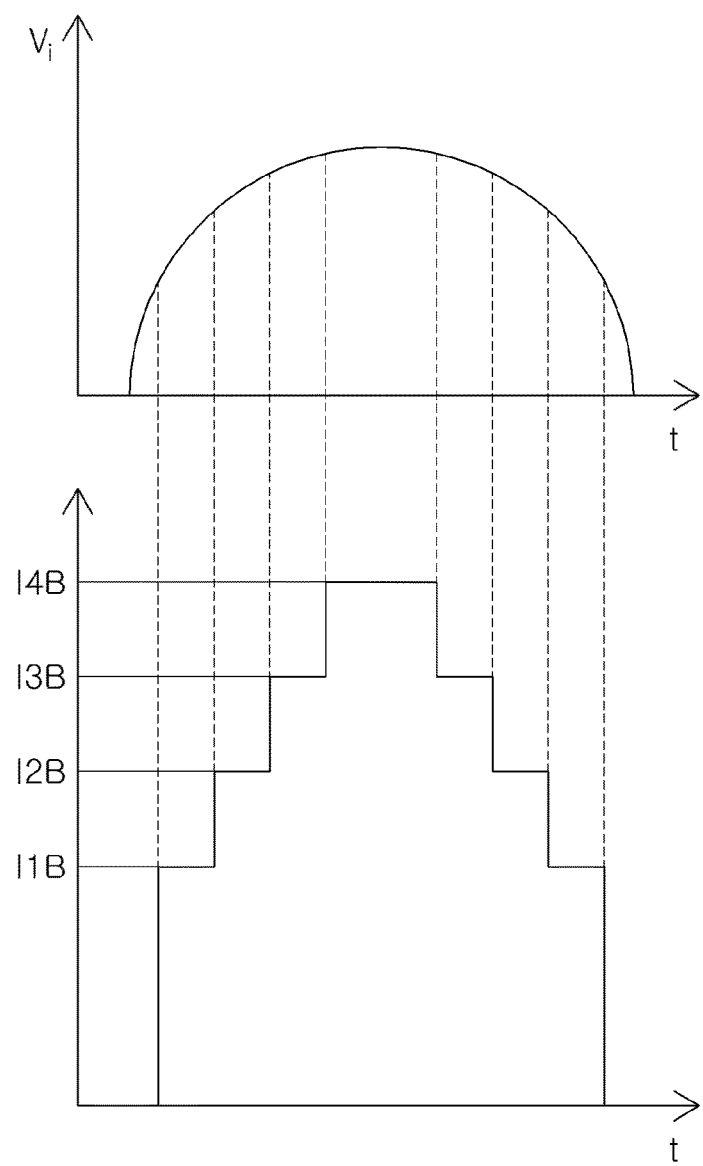

FIGS. 6A and 6B are diagrams illustrating currents flowing in a distribution switch unit according to the exemplary embodiment of FIG. 5.

Referring to FIGS. 4 to 6B, an upper graph illustrates an example of one period of a waveform of an output voltage Vi of the power supply unit 410 on a time axis. A lower graph illustrates currents flowing in the transistors according to the output voltage Vi of the power supply unit 410 on the time axis.

Referring to FIG. 6A, according to a change of the time axis of the output voltage Vi, the first current I1A flows in the first transistor 441 of the first distribution switch unit 440, the second current I2A flows in the second transistor 442, the third current I3A flows in the third transistor 443, and the fourth current I4A flows in the fourth transistor 444. As such, according to a voltage increase of the output voltage Vi, the light emitting diode elements included in the first light emitting unit 420 are sequentially turned on.

Referring to FIG. 6B, according to the change of the time axis of the output voltage Vi, the fifth current I1B flows in the fifth transistor 451 of the second distribution switch unit 450, the sixth current I2B flows in the sixth transistor 452, the seventh current I3B flows in the seventh transistor 453, and the eighth current I4B flows in the eighth transistor 454.

As such, the first current I1A, the second current I2A, the third current I3A, and the fourth I4A have the same values as the fifth current I1B, the sixth current I2B, the seventh current I3B, and the eighth current I4B, respectively.

FIG. 7 is a diagram illustrating a method for driving a lighting apparatus of a case in which light emitting units of the lighting apparatus are connected in series with each other according to an exemplary embodiment of the present invention.

Referring to FIGS. 4 and 7, in the case in which the voltage input from the power supply unit 410 is greater than the switching control reference voltage value, the switching controlling unit 500 may turn off the switch unit 480 to connect the first light emitting unit 420 and the second light emitting unit 430 in series with each other.

In this case, a first current I1 flows in the first transistor 441 of the first distribution switch unit 440, a second current I2 flows in the second transistor 442, a third current I3 flows in the third transistor 443, and a fourth current I4 flows in the fourth transistor 444.

A fifth current I5 flows in the fifth transistor 451 of the second distribution switch unit 450, a sixth current I6 flows in the sixth transistor 452, a seventh current I7 flows in the seventh transistor 453, and an eighth current I8 flows in the eighth transistor 454.

In this case, the first light emitting unit 420 and the second light emitting unit 430 are connected in series with each other to form a total of eight channels ('eight light emitting diode elements').

As a first example, in the case in which the input voltage value is smaller than the switching control reference voltage, the first reference voltage controlling unit 510 may turn on the switches 511, 513, 515, and 517 so that the distribution switch reference voltages ($V_{L1}$, $V_{L2}$, $V_{L3}$, and $V_{L4}$) of the first reference voltage supplying unit are supplied to the transistors 441, 442, 443, and 444 of the first distribution switch unit 440, and the second reference voltage controlling unit 520 may turn on the switches 521, 523, 525, and 527 so that the distribution switch reference voltages ($V_{L5}$, $V_{L6}$, $V_{L7}$, and $V_{L8}$) of the third reference voltage supplying unit are supplied to the transistors 451, 452, 453, and 454 of the second distribution switch unit 450.

On the other hand, in the case in which the input voltage value is greater than the switching control reference voltage, the first reference voltage controlling unit 510 may turn on the switches 511, 513, 515, and 517 so that the distribution switch reference voltages ($V_{L1}$, $V_{L2}$, $V_{L3}$, and $V_{L4}$) of the first reference voltage supplying unit are supplied to the transistors 441, 442, 443, and 444 of the first distribution switch unit 440, and the second reference voltage controlling unit 520 may turn on the switches 522, 524, 526, and 528 so that the distribution switch reference voltages ($V_{115}$, $V_{116}$, and $V_{H8}$) of the fourth reference voltage supplying unit are supplied to the transistors 451, 452, 453, and 454 of the second distribution switch unit 450.

As a second example, in the case in which the input voltage value is smaller than the switching control reference voltage, the first reference voltage controlling unit 510 may turn on the switches 512, 514, 516, and 518 so that the distribution switch reference voltages ($V_{H1}$, $V_{H2}$, $V_{H3}$, and $V_{H4}$) of the second reference voltage supplying unit are supplied to the transistors 441, 442, 443, and 444 of the first distribution switch unit 440, and the second reference voltage controlling unit 520 may turn on the switches 522, 524, 526, and 528 so that the distribution switch reference voltages ($V_{H5}$, $V_{H6}$, $V_{H7}$, and $V_{H8}$) of the fourth reference voltage supplying unit are supplied to the transistors 451, 452, 453, and 454 of the second distribution switch unit 450.

On the other hand, in the case in which the input voltage value is greater than the switching control reference voltage, the first reference voltage controlling unit 510 may turn on the switches 511, 513, 515, and 517 so that the distribution switch reference voltages ($V_{L1}$, $V_{L2}$, $V_{L3}$, and $V_{L4}$) of the first reference voltage supplying unit are supplied to the transistors 441, 442, 443, and 444 of the first distribution switch unit 440, and the second reference voltage controlling unit 520 may turn on the switches 522, 524, 526, and 528 so that the distribution switch reference voltages ($V_{H5}$, $V_{H6}$, $V_{H7}$, and $V_{H8}$) of the fourth reference voltage supplying unit are supplied to the transistors 451, 452, 453, and 454 of the second distribution switch unit 450.

The power controlling unit 530 changes resistances of the first variable resistor unit 460 and the second variable resistor unit 470 according to the input voltage value, thereby making it possible to uniformly maintain output power of the first light emitting unit 420 and the second light emitting unit 430.

Figure 8:
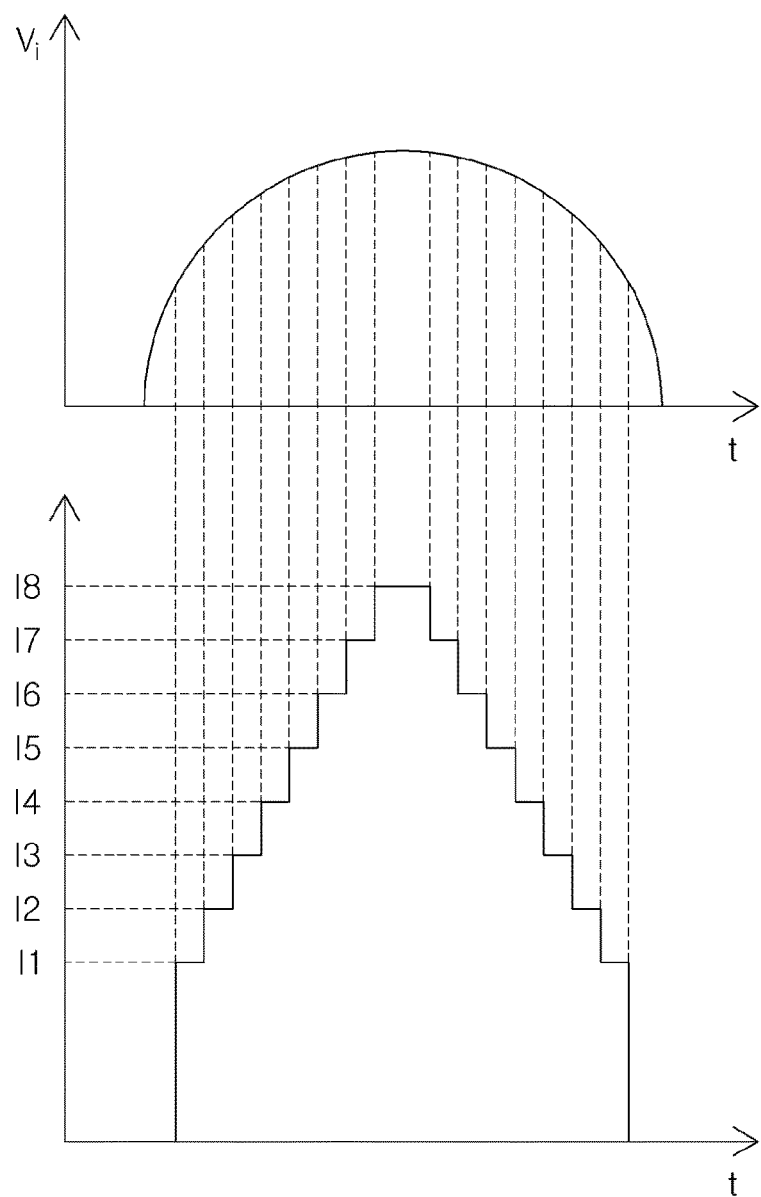
FIG. 8 is a diagram illustrating a current flowing in a distribution switch unit according to the exemplary embodiment of FIG. 7.

FIG. 8 is a diagram illustrating a current flowing in a distribution switch unit according to the exemplary embodiment of FIG. 7.

Referring to FIGS. 4, 7, and 8, an upper graph illustrates an example of one period of a waveform of an output voltage Vi of the power supply unit 410 on a time axis. A lower graph illustrates currents flowing in the transistors according to the output voltage Vi of the power supply unit 410 on the time axis.

Referring to FIG. 8, according to a change of the time axis of the output voltage Vi, the first current I1 flows in the first transistor 441 of the first distribution switch unit 440, the second current I2 flows in the second transistor 442, the third current I3 flows in the third transistor 443, and the fourth current I4 flows in the fourth transistor 444. Next, the fifth current I5 flows in the fifth transistor 451 of the second distribution switch unit 450, the sixth current I6 flows in the sixth transistor 452, the seventh current I7 flows in the seventh transistor 453, and the eighth current I8 flows in the eighth transistor 454.

As such, according to the change of the time axis of the output voltage Vi, the first current I1, the second current I2, the third current I3, the fourth current I4, the fifth current I5, the sixth current I6, the seventh current I7, and the eighth current I8 sequentially flow into the transistors. Accordingly, the transistors 441, 442, 443, 444, 451, 452, 453, and 454 are sequentially turned on.

As such, in the case in which the input voltage is greater than the switching control reference voltage, and the first light emitting unit 420 and the second light emitting unit 430 are connected in series with each other, the reference voltage input to the second distribution switch 450 is changed, thereby driving all of the first distribution switch 440 and the second distribution switch 450.

Accordingly, as compared to the case in which only the specific light emitting unit is driven, a heating problem may be significantly reduced. Further, as compared to the case in which N channels are used, 2*N channels are used, thereby making it possible to increase power efficiency.

According to the exemplary embodiments having the configuration described above, even in the case in which the magnitude of the applied voltage is changed, the magnitude of the resistance of the variable resistor unit is adjusted, thereby making it possible to uniformly maintain the power consumed by the light emitting units.

Further, the reference voltage applied to the distribution switch unit is changed according to the magnitude of the applied voltage, thereby making it possible to significantly reduce the heating problem by optimizing the driving of the LED connected to the distribution switch unit.

Further, according to an exemplary embodiment of the present invention, when the input voltage is greater than the switching control reference voltage, as compared to the case in which only one distribution switch unit is driven to use the N channels, both of the two distribution switch units are used to use the 2*N channels, thereby making it possible to increase the power efficiency.

Further, according to an exemplary embodiment of the present invention, the connection of the light emitting units is changed to the series connection or the parallel connection according to the input voltage value, thereby making it possible to drive the light emitting units without adding a separate apparatus or exchanging an internal apparatus even in the case in which the voltages having different magnitudes are input.

The configurations and the methods of the above-mentioned exemplary embodiments are not restrictively applied to the lighting apparatus as described above. That is, all or some of the respective exemplary embodiments may be selectively combined with each other so that they may be various modified.

What is claimed is:

1. A lighting apparatus comprising:
a power supply unit generating alternating current (AC) power;
a first light emitting unit connected in series to the power supply unit and including a plurality of light emitting groups, each light emitting group including at least one light emitting diode element that emits light according to a power supply voltage from the power supply unit, the plurality of light emitting groups each being connected to one another in series;
a second light emitting unit connected in series to the first light emitting unit and including a plurality of light emitting groups, each light emitting group including at least one light emitting diode element that emits light according to an input voltage through the power supply unit or the first light emitting unit, the plurality of light emitting groups each being connected to one another in series;
a first distribution switch unit including a plurality of switches arranged to correspond to the respective light emitting groups so as to switch on or off a current of the light emitting diode element, wherein one end of each switch is connected to a rear stage of each of the plurality of light emitting groups in the first light emitting unit and the other ends of the plurality of switches are connected in common;
a second distribution switch unit including a plurality of switches arranged to correspond to the respective light emitting groups so as to switch on or off a current of the light emitting diode element, wherein one end of each switch is connected to a rear stage of each of the plurality of light emitting groups in the second light emitting unit and the other ends of the plurality of switches are connected in common;
a voltage detecting unit connected in series to the power supply unit and measuring a power supply voltage from the power supply unit;
a switching controlling unit for determining whether to connect the first light emitting unit and the second light emitting unit in parallel or in series, based on a peak value of the power supply voltage measured and maintained by the voltage detecting unit;
a reference voltage controlling unit for selectively controlling the switches in the first distribution switch unit and the second distribution switch unit which are connected to the respective rear stages of the light emitting groups in the first light emitting unit and the second light emitting unit, according to the power supply voltage value measured by the voltage detecting unit, in such a manner as to light up the plurality of light emitting groups sequentially from the light emitting group closest to the power supply unit;
a first variable resistor unit connected between the other ends connecting the respective switches in common in the first distribution switch unit and a ground, and including a variable resistor;
a second variable resistor unit connected between the other ends connecting the respective switches in common in the second distribution switch unit and the ground, and including a variable resistor;
a power controlling unit changing resistance values of the variable resistors included in the first variable resistor unit and the second variable resistor unit, based on the peak value of the power supply voltage measured and maintained by the voltage detecting unit, to constantly maintain power consumed by the first light emitting unit and the second light emitting unit; and
a switch unit connected in series between the power supply unit and the second light emitting unit and controlled by the switching controlling unit, wherein the switch unit is turned on to connect the first light emitting unit and the second light emitting unit in parallel when the peak value of the power supply voltage measured and maintained by the voltage detecting unit is smaller than a switching control reference voltage, and the switch unit is turned off to connect the first light emitting unit and the second light emitting unit in series when the peak value of the power supply voltage measured and maintained by the voltage detecting unit is greater than the switching control reference voltage,
wherein the power controlling unit is configured to:
change the resistance values of the variable resistor of the first variable resistor unit and the variable resistor of the second variable resistor unit to a same resistance value when the peak value of the power supply voltage measured and maintained by the voltage detecting unit is smaller than the switching control reference voltage, and
change the resistance values of the variable resistor of the first variable resistor unit and the variable resistor of the second variable resistor unit to respectively different resistance values when the peak value of the power supply voltage measured and maintained by the voltage detecting unit is greater than the switching control reference voltage,
wherein the reference voltage controlling unit provides a first distribution switch reference voltage to the first distribution switch unit and the second distribution switch unit when the peak value of the power supply voltage measured and maintained by the voltage detecting unit is smaller than the switching control reference voltage, and
wherein the reference voltage controlling unit provides the first distribution switch reference voltage to the first distribution switch unit and a second distribution switch reference voltage having a value greater than the first distribution switch reference voltage to the second distribution switch unit when the peak value of the power supply voltage measured and maintained by the voltage detecting unit is greater than the switching control reference voltage.

2. The lighting apparatus of claim 1, wherein:
the first variable resistor unit and the second variable resistor unit include one or more variable resistors having respectively different variable resistor ranges, and
the power controlling unit selects the variable resistor having a same variable resistor range from among the variable resistor of the first variable resistor unit and the variable resistor of the second variable resistor unit to change the resistance values of the variable resistors to a same resistance value when the peak value of the power supply voltage measured and maintained by the voltage detecting unit is smaller than the switching control reference voltage, and selects the variable resistor having respectively different variable resistor ranges from among the variable resistor of the first variable resistor unit and the variable resistor of the second variable resistor unit to change the resistance values of the variable resistors to respectively different resistance values when the peak value of the power supply voltage measured and maintained by the voltage detecting unit is greater than the switching control reference voltage.

3. The lighting apparatus of claim 1, wherein the first distribution switch unit and the second distribution switch unit include one or more transistors, as the switches, which are turned on only in a specific range of voltage from among power supply voltage from the power supply unit.

4. The lighting apparatus of claim 3, wherein a number of the transistors is equal to a number of the light emitting groups respectively included in the first light emitting unit and the second light emitting unit.

5. The lighting apparatus of claim 3, wherein:
the first light emitting unit and the second light emitting unit each have N light emitting groups, each light emitting group including a plurality of light emitting diode elements, and
an input end of each transistor is connected to a rear stage of each of the N light emitting groups and output ends of the transistors are connected to a common, and have a same number as 2×N, which is a number of all the light emitting groups.

6. The lighting apparatus of claim 1, wherein the reference voltage controlling unit includes:
a first distribution switch reference voltage providing unit supplying the first distribution switch reference voltage; and
a second distribution switch reference voltage providing unit supplying the second distribution switch reference voltage having a value greater than the first distribution switch reference voltage.

7. The lighting apparatus of claim 1, wherein:
the first distribution switch unit and the second distribution switch unit each include one or more transistors, as the switches, which are turned on only in a specific range of voltage from among power supply voltage from the power supply unit, and
the reference voltage controlling unit changes the first distribution switch reference voltage and the second distribution switch reference voltage applied to the transistors so that the transistors are turned on only in the specific range of voltage, according to the power supply voltage value measured by the voltage detecting unit.

8. The lighting apparatus of claim 1, wherein the first light emitting unit includes one or more reverse-current breaking units connected in series to a rearest stage of the light emitting groups.

9. The lighting apparatus of claim 1, wherein the power supply unit includes
an AC power generating unit generating an AC waveform; and
a rectifying unit rectifying the AC power output from the AC power generating unit.

* * * * *